United States Patent
Huck et al.

(10) Patent No.: US 7,683,513 B2
(45) Date of Patent: Mar. 23, 2010

(54) ELECTRIC MOTOR WITH SPLIT MAGNETIC RETURN ELEMENT

(75) Inventors: Thomas Huck, Rheinmuenster (DE); Tarek Mili, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 192 days.

(21) Appl. No.: 11/994,788

(22) PCT Filed: Aug. 17, 2006

(86) PCT No.: PCT/EP2006/065388

§ 371 (c)(1),
(2), (4) Date: Jan. 4, 2008

(87) PCT Pub. No.: WO2007/039343

PCT Pub. Date: Apr. 12, 2007

(65) Prior Publication Data

US 2008/0197734 A1 Aug. 21, 2008

(30) Foreign Application Priority Data

Sep. 30, 2005  (DE) .................. 10 2005 047 445

(51) Int. Cl.
*H02K 5/24* (2006.01)
(52) U.S. Cl. ..................... 310/89; 310/154.09
(58) Field of Classification Search .............. 310/89, 310/91, 154.08–154.09, 156.08; 29/59–598, 29/607

See application file for complete search history.

(56) References Cited

U.S. PATENT DOCUMENTS

| 3,422,295 | A | * | 1/1969 | Parker ................. 310/154.07 |
| 3,942,054 | A | * | 3/1976 | Kristen et al. ............. 310/179 |
| 4,163,165 | A | * | 7/1979 | Purdy .................. 310/154.08 |
| 5,175,460 | A | * | 12/1992 | Ishizuka ............... 310/154.09 |
| 5,185,546 | A | * | 2/1993 | Kielbas et al. .......... 310/216.012 |
| 6,515,389 | B1 | * | 2/2003 | Hartz .................. 310/154.08 |
| 6,700,269 | B2 | * | 3/2004 | Torii et al. ............. 310/154.08 |
| 6,708,388 | B1 | * | 3/2004 | Yamashita et al. ............ 29/596 |
| 7,508,109 | B2 | * | 3/2009 | Yokota et al. ......... 310/216.048 |

FOREIGN PATENT DOCUMENTS

| DE | 2 222 666 | 11/1973 |
| DE | 102 52 240 | 2/2005 |
| GB | 1 389 519 | 4/1975 |
| JP | 2000-50537 | 2/2000 |
| WO | 2005/013458 | 2/2005 |

* cited by examiner

*Primary Examiner*—Tran N Nguyen
(74) *Attorney, Agent, or Firm*—Michael J. Striker

(57) ABSTRACT

The invention relates to an electric motor (10) and to a method for producing said electric motor, especially for adjusting mobile parts in a motor vehicle. Said electric motor comprises a rotor (12), a lower housing part (16) and an upper housing part (18) which can be radially assembled in relation to the rotor (12), and at least two permanent magnets (22) that are coupled to each other by means of a magnetic feedback element (24). Said feedback element comprises a lower feedback sheet (28) and an upper feedback sheet (30), the upper feedback sheet (30) having a stop face (40) that rests on a mating stop face (42) of the lower housing part (16).

16 Claims, 3 Drawing Sheets

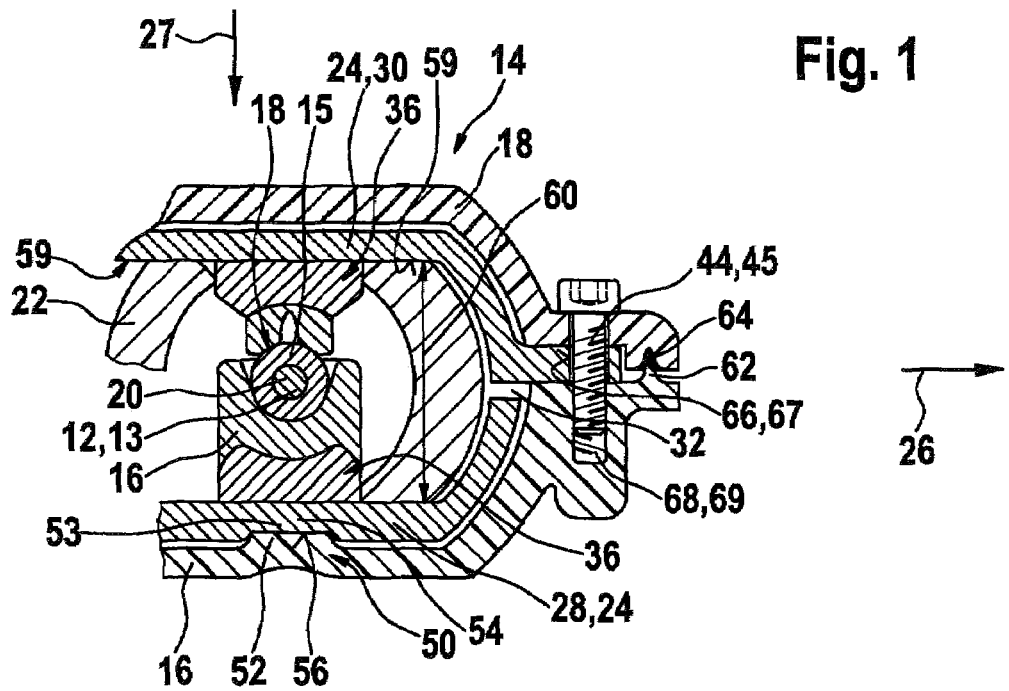

ELECTRIC MOTOR WITH SPLIT MAGNETIC RETURN ELEMENT

RELATED ART

Figure 3:
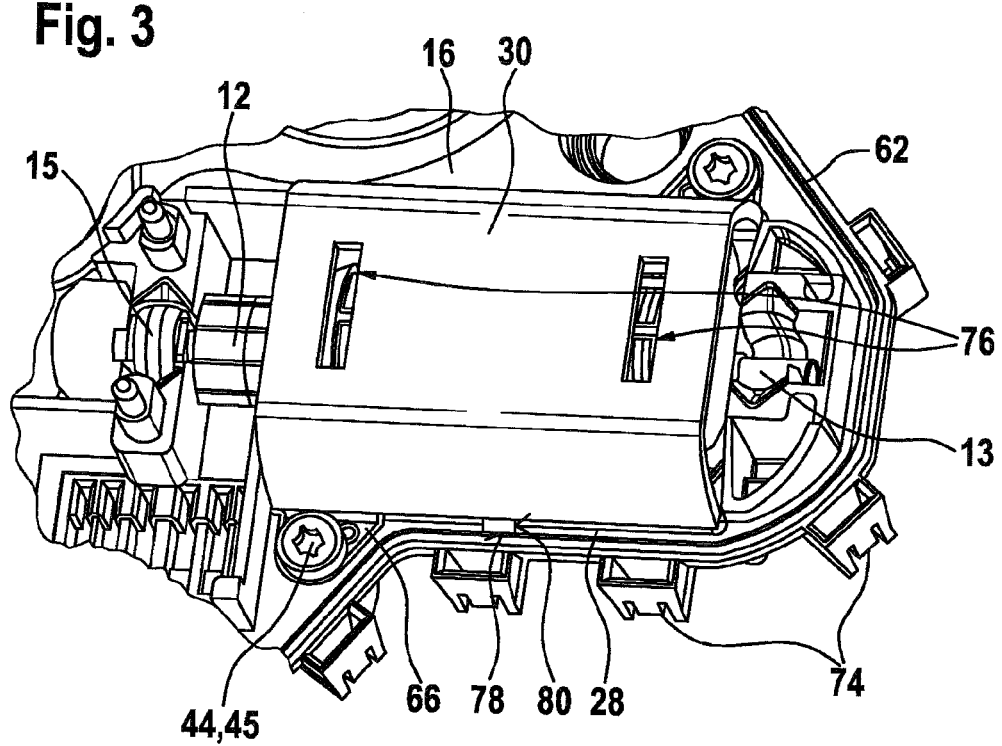

The present invention relates to an electric motor and a method for manufacturing an electric motor of this type, in particular for adjusting movable parts in a motor vehicle, with a split magnetic return element according to the general class of the independent claims.

Publication DE 10352240 A1 makes known an electric motor, the housing of which is composed of two half shells, which are installable radially to the armature shaft. Two permanent magnets—which are magnetically coupled with each other via two separated magnetic return parts—are located around the rotor in the housing. The magnetic return elements are clamped together when the two housing parts are installed radially, thereby fixing them in position in three dimensions. Due to the manufacturing tolerance of the individual components, there is a certain level of inaccuracy in the positioning of the return plates and, therefore, in the positioning of the permanent magnets relative to the armature. The quality of the electric motor is therefore affected to a considerable extent. The tolerance chain of the individual components also results in a certain amount of play between the components, which results in disturbing noises being produced during operation.

DISCLOSURE OF THE INVENTION

The inventive electric motor and its manufacturing method with the characterizing features of the independent claims have the advantage that disturbing component tolerances may be compensated for by integrally forming a defined stop surface on the upper magnetic return plate, which bears against a corresponding counter-stop surface of the lower housing part.

As a result, the permanent magnets and the two return plates are fixed in an exact position securely and permanently, thereby making it possible to effectively prevent power losses and disturbing noises.

Advantageous refinements and improvements of the features indicated in the independent claims are made possible by the measures listed in the subclaims. By fixing the upper return plate into position directly on the lower housing part, a defined preload force may be produced, with which the permanent magnets and the two return plates are retained in their positions.

Recesses for separate fastening means may be integrally formed in the upper return plate to simplify installation. These recesses may be connected with counter-recesses in the lower housing part via application of a defined amount of force.

In a preferred embodiment of the present invention, the fastening means are screws, which are screwed into a corresponding bore of the lower housing part in a self-tapping manner.

A recess is provided on either side of the rotor axis for use to securely attach the upper return plate. The recesses are preferably located diagonally to the rotor axis, to prevent the return plate from tilting in the axial direction.

To compensate for component tolerances of the individual components (housing parts, return plates, permanent magnets, rotor), a gap is provided between the two return plates, which takes on a certain dimension depending on the tolerance compensation that exists. It is thereby ensured that the permanent magnets are always clamped securely between the two return plates.

It is advantageous to form a central raised area on the lower housing part, against which the lower return plate bears nearly in the center. A deformation of the lower housing shell is therefore made possible, without the lower return plate also becoming deformed. As a result, the necessary preload force and the required tolerance compensation may be attained via the deformation of the lower housing part.

It is favorable when the lower return plate includes a corresponding taper in the region of the raised area of the base surface, by way of which the lower return element may be easily positioned relative to the lower housing shell and an exact dimension for the tolerance chain may be specified.

By clamping the permanent magnets between the return plates and the lower housing part, the upper return plate is fixed in position on the lower housing part, and a very stable assembly with exact position dimensions is created that is independent of the installation of the upper housing part.

The return plates may be formed in a very cost-favorable manner as one-piece, bent-punched parts, it being possible to form the recesses in one process. The housing parts may be manufactured in a very cost-favorable manner using plastic injection-molding methods, which also ensures that the elasticity required for the preload is attained.

To ensure that the permanent magnets maintain a defined radial distance from the rotor, magnet splitters are inserted radially between the permanent magnets. The magnet splitters press the two magnets against each other in the radial direction. Advantageously, the magnet splitters may be integrally formed as a single piece in the housing parts.

When the return plates include radial openings into which the magnet splitters are inserted, the magnet splitters may be easily positioned using the return plates. Due to the integrally formed, radial openings, the return plates may extend across the entire axial length of the permanent magnets, thereby increasing their efficiency.

To securely fix the magnetic half shells in their radial position relative to the armature, securing elements are integrally formed in the lower housing part, which extend through the return plate and bear directly against the permanent magnets and brace them radially. As a result, the permanent magnets are clamped tightly by the return plates in the direction of installation, and they are fixed securely in position in the radial direction (relative to the magnetic half shells) using the combination of the magnet splitters with the securing elements.

Due to the inventive manufacturing method, the electric motor and an adjacent transmission unit may be advantageously installed completely in one radial installation direction. The magnets are positioned securely via the radial installation of the upper return plate onto the lower housing part and by connecting them directly with each other. It is therefore not necessary to use additional components, such as spring elements in a pole pot. Given that the upper return part is positioned via its contact surface on the counter-contact surface of the lower housing part and is fixed in position with preload, a precise magnetic circuit with high robustness and stability is created.

By screwing the upper return plate securely to the lower housing part, the upper housing part may be installed on the lower housing part fully independently of the magnetic circuit. As a result, simpler or less dimensionally-exact connecting methods may be used for this purpose, such as snapping into place or bonding. If the upper housing part would become deformed, this would not affect the dimensional tolerance of the magnetic circuit.

To ensure that the permanent magnets are positioned radially exactly relative to the rotor during assembly before the magnets are clamped by the return plates, the permanent magnets are brought into the correct installation position using the separating tool. The separating tool advantageously extends through the radial openings in the upper return plate and, once the upper return plate is installed, it is removed from the lower housing shell. When the upper housing part is installed, magnet splitters located thereon may then be inserted in the openings, thereby preventing the permanent magnets from coming loose for the duration of the entire service life of the electric motor.

DRAWING

Various exemplary embodiments of a device according to the present invention are presented in the drawing and are described in greater detail in the description below.

Figure 4:
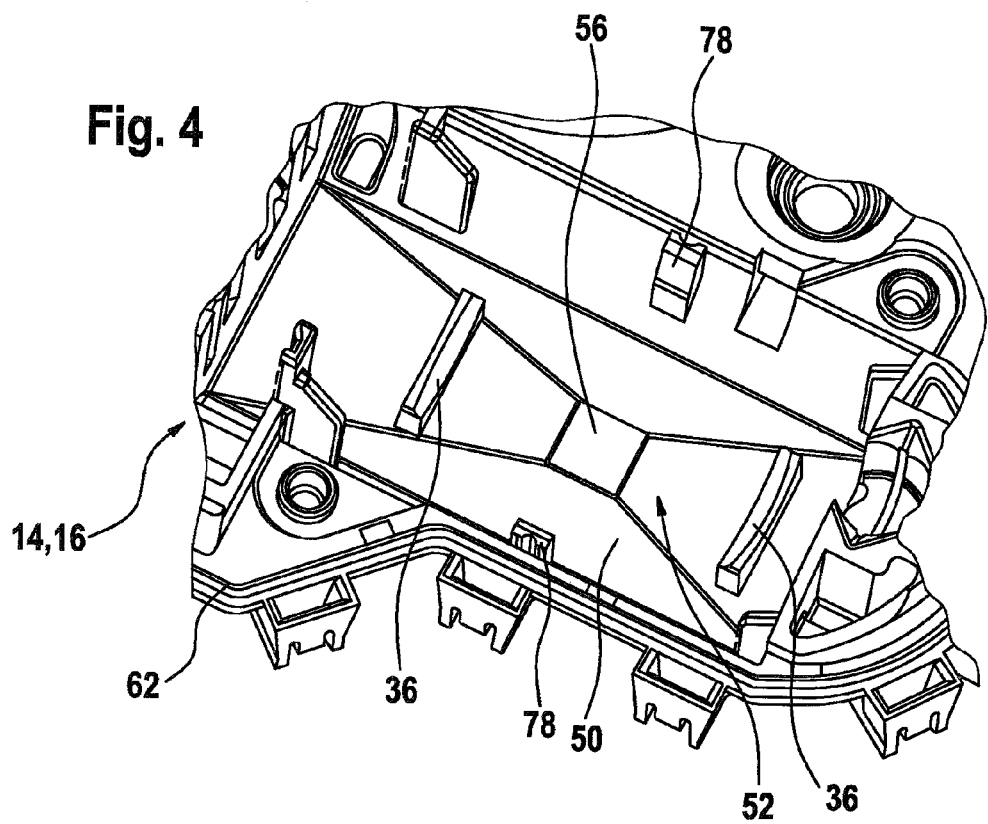

FIGS. 1 and 2 show a cross section and a longitudinal sectional view of an inventive electric motor, FIG. 3 shows a view of further exemplary embodiment, and FIG. 4 shows a lower housing part according to FIG. 3 before the rotor with the magnetic circuit is installed.

DESCRIPTION OF THE EXEMPLARY EMBODIMENTS

A sectional view of an electric motor 10 is shown in FIG. 1, in the case of which a rotor 12 is located in a housing 14 that includes a lower housing part 16 and an upper housing part 18, which may be connected with each other radially relative to the axis of rotor 12. Rotor 12 includes an armature shaft 13, which is supported between the two housing parts 16, 18 via bearing elements 15. Permanent magnets 22—which are magnetically coupled with each other via a magnetic return element 24—are located around rotor 12. Permanent magnets 22 are designed, e.g., as shells, and they are located opposite from each other in radial direction 26 relative to rotor 12. Magnetic return element 24 includes a lower return plate 28 and an upper return plate 30, which, taken together, enclose permanent magnets 22. The shells of permanent magnets 22 are rotated by nearly 900 relative to the two shell-shaped return plates 28, 30. A gap 32 is located between the lower and upper return plates 28, 30. Gap 32 extends across the entire axial length 34 of return element 24. As a result, the two return plates 28, 30 do not touch each other. Magnet splitters 36 are located between the two permanent magnets 22, establishing a distance between the two permanent magnets 22 in radial direction 26. In this exemplary embodiment, magnet splitters 36 are integrally formed as one piece on lower and upper housing parts 16, 18, which are made of plastic, using injection-molding methods in particular. Upper return plate 30 includes a stop surface 40, which bears against a counter-stop surface 42 of lower housing part 16. Counter-stop surface 42 is located on the upper edge of shell-shaped, lower housing part 16 and forms a type of flange for stop surface 40, which is integrally formed on the lower edge of upper return plate 30. Stop surface 40 is connected directly with counter-stop surface 42 via connecting means 44. Stop surfaces 40, 42 thereby form a reference surface 46 for installation of return element 24 and permanent magnets 22. A specifiable distance 48—which may be made very precise using production engineering means—results between stop surface 40 and rotor axis 20. Permanent magnets 22 are pressed against lower return plate 28 via upper return plate 30, and lower return plate 28 bears against lower housing part 16. To this end, lower housing part 16 includes a raised area 52 on its base surface 50, which bears nearly against center 54 of lower return plate 28. In the exemplary embodiment, lower return plate 28 includes a taper 53, in which raised area 52 engages. After lower return part 28 is manufactured, taper 53 is integrally formed thereon with very narrow tolerances, in order to define an exactly specifiable dimension for the placement of raised area 52. A locally limited pressure surface 56 forms between lower return plate 28 and raised area 52. As a result, lower housing part 16 deforms between pressure surface 56 and reference surface 46 in order to compensate for component tolerances and apply a preload force in installation direction 27, to fix permanent magnets 22 in position. Via raised area 52, lower return plate 28 is separated from lower housing part 16 across a wide tangential region, thereby enabling it to deform easily. The tolerance chain starts at reference surface 46 and extends across distance 48 to an inner surface 59 of upper return plate 30, against which permanent magnets 22 bear in installation direction 27. The position of adjacent pressure surface 56 is determined relative to reference surface 46 via installation height 60 of permanent magnets 22. Due to the fixed connection between stop surface 40 and counter-stop surface 42 (upper return plate 30 with lower housing part 16), the tolerances that occur are compensated for by gap 32 and via the deformation of lower housing part 16. In the exemplary embodiment shown in FIG. 1, upper housing part 18 is connected with lower housing part 16 at the same time that upper return plate 30 is connected to lower housing part 16. A sealing edge 62 and a corresponding seal 64 are located between lower housing part 16 and upper housing part 18. Sealing edge 62 and seal 64 seal housing 14 once housing parts 16, 18 are connected. Connecting means 44 between upper return plate 30 and lower housing part 16 are formed as screws 45 in this case, which are accommodated in recesses 66 in upper return plate 30 and engage in counter-recesses 68 in lower housing part 16. Recesses 66 are formed as one piece with upper return plate 30, as receiving tabs 67, on which stop surface 40 is also integrally formed at the same time. Counter-recesses 68 are designed as threaded holes 69, into which the thread of connecting means 44 taps.

FIG. 2 is a longitudinal sectional view of the exemplary embodiment in FIG. 1. In this case, in one variation, stop surface 40 is not integrally formed on recesses 66 for connecting means 44. In this embodiment, stop surfaces 40 are integrally formed, e.g., on the axial ends of upper return plate 30, and recesses 66 are integrally formed, e.g., axially in the center. Power flow 71 is indicated in FIG. 2. Power flow 71 acts via connecting means 44 on adjacent pressure surface 56 and thereby brings about a deformation 72 of lower housing part 16 on its base surface 50, which is indicated by arrows 72.

FIG. 3 shows a further variation of an inventive drive unit 10, with which recesses 66 are located diagonally to rotor axis 20. Only upper return plate 30 (without housing part 18) is fixedly connected with lower housing part 16 at recesses 66 via connecting means 44. Upper housing part 18, which is not shown here, may be joined with lower 10 housing part 16 completely independently of the installation of return element 24 after it is installed. To this end, snap-in elements 74, e.g., are integrally formed on housing parts 16, 18, via which the two housing parts 16, 18 are snapped or clipped together. Return plates 28, 30 include radial openings 76 into which not-shown magnet splitters 36 may engage in order to press the two permanent magnets 22 away from each other in radial direction 26. Return plates 28, 30 are manufactured, e.g., as bent-punched parts composed of magnetically conductive material, on the edge of which receiving tabs 67 are integrally formed as one piece. Radial openings 76 may be punched out easily.

FIG. 4 shows lower housing part 16 of the exemplary embodiment in FIG. 3 before rotor 12 and return element 24 are installed. Magnet splitters 36 are located on base surface 50, and they are formed as one piece with housing part 16, e.g., via injection molding. A raised area 52 is integrally formed in base surface 50. After lower return plate 28 is installed in center 54 of raised area 52, raised area 52 forms a limited pressure surface 56. Raised area 52 is designed in the shape of a pyramid in this case, so that lower housing part 16 may deform in all four directions relative to limited pressure surface 56. The flattened tip of the pyramid represents the limited pressure surface 56. In addition, securing elements 78 are located on lower housing part 16, and extend through openings 80 in lower return plate 28 and bear against permanent magnets 22 in radial direction 26. Permanent magnets 22 are therefore fixed in position in radial direction 26 by the combination of magnet splitters 36 and securing elements 78, the function of which may also be performed directly by lower return plate 28. Permanent magnets 22 are clamped in installation direction 27 between upper return plate 30 and lower housing part 16 via connecting means 44.

To install inventive electric motor 10, lower return plate 28 is first placed in lower housing part 16 in installation direction 27. Rotor 12 is then installed in lower housing part 16 via bearing elements 15. Magnetized permanent magnets 22 are then inserted in lower return plate 28 and covered with upper return plate 30. Upper return plate 30, which bears via a stop surface 40 against counter-stop surface 42 of lower housing part 16, is then fixedly connected with lower housing part 16, e.g., it is screwed together with it. During this fastening procedure, permanent magnets 22 are held in position in radial direction 26 using a separating tool for magnets 22. After the screws are tightened, the magnetic circuit is fully assembled, and upper housing part 18 may be connected with lower housing part 16 at any time, e.g., after the transmission is installed.

It should be noted that, with regard for the exemplary embodiments presented in the figures and the description, many different combinations of the individual features are possible. For example, the specific positioning of stop surface 40 and recesses 66 in upper return plate 30—and the number of them—may be varied. Instead of screws 45, other connecting means 44 may be used. Likewise, the shape and positioning of raised area 52, magnet splitters 36, and securing elements 78 may be varied. Inventive electric motor 10 is preferably used for a transmission drive unit, with which electric motor 10 and a downstream transmission are located in the same housing. The housing may also include housing parts in addition to two shell-shaped housing parts 16, 18.

What is claimed is:

1. An electric motor (10), for adjusting movable parts in a motor vehicle, with a rotor (12), a lower housing part (16), and an upper housing part (18), which may be connected radially relative to the rotor (12), and with at least two permanent magnets (22), which are coupled via a magnetic return element (24), which includes a lower return plate (28) and an upper return plate (30),
wherein
the upper return plate (30) includes a stop surface (40) that bears against a counter-stop surface (42) of the lower housing part (16).

2. The electric motor (10) as recited in claim 1,
wherein
the upper return plate (30) is installed directly on the lower housing part (16).

3. The electric motor (10) as recited in claim 1,
wherein
recesses (66) for fastening means (44) are located in the upper return plate (30);
fastening means (44) engage in the counter-recesses (68) in lower housing part (16).

4. The electric motor (10) as recited in claim 1,
wherein
the fastening means (44) are designed as screws (45), which engage, in the counter-recesses (68), which are designed as threaded bores (69).

5. The electric motor (10) as recited in claim 1,
wherein
two recesses (66) are integrally formed diagonally with the axis (20) of the rotor (12).

6. The electric motor (10) as recited in claim 1,
wherein
at least one gap (32) is located between the at least two return plates (28, 30), gap (32) extending across the entire axial length (34) of the return element (24).

7. The electric motor (10) as recited in claim 1,
wherein
the lower return plate (28) bears against a raised area (52) of a base surface (50) of the lower housing part (16), and the raised area (52) is located, in the center (54) of the lower return plate (28).

8. The electric motor (10) as recited in claim 1,
wherein
a taper (53)—which has been formed, via subsequent stamping—is formed in the center of the lower return plate (28) and bears against the raised area (52) of the base surface (50).

9. The electric motor (10) as recited in claim 1,
wherein
the lower return plate (28) is pressed against the raised area (52) of the base surface (50) via the permanent magnets (22) when the upper return plate (30) is installed on the lower housing part (16); the lower housing part (16), is permanently deformed as a result.

10. The electric motor (10) as recited in claim 1,
wherein
the housing parts (16, 18) are composed of plastic, and the return plates (28, 30) are designed as metallic punched-bent parts; the recesses (66) are integrally formed as one piece with as tabs (67).

11. The electric motor (10) as recited in claim 1,
wherein
a magnet splitter (36) is located on the lower and/or upper housing part (16, 18), which engages—as a spacer—radially between the two permanent magnets (22).

12. The electric motor (10) as recited in claim 1,
wherein
the return plates (28, 30) include radial holes (76), through which the magnet splitters (36) extend.

13. The electric motor (10) as recited in claim 1,
wherein
securing elements (78) are located on the lower housing part (16), which engage in recesses (80) of lower return plate (28) and press the permanent magnets (22) radially against the rotor (12).

14. A method for manufacturing an electric motor (10), as recited in claim 1, with at least one rotor (12), which is supported in a lower housing part (16) and in an upper housing part (18), and with at least two permanent magnets (22), which are coupled with each other magnetically via a lower return part (28) and an upper return part (30), characterized by the following assembly steps:

The lower return part (28) is inserted into the lower housing part (16),

The permanent magnets (22) and the rotor (12) are positioned inside the first return part (28), The upper return part (30) is placed on the permanent magnets (22), and it is placed via a stop surface (40) on a counter-stop surface (42) of the lower housing part (16), The upper return part (30) is fastened to the lower housing part (16) in such a manner that the lower return part (28) is pressed via the permanent magnets (22) against the lower housing part (16).

15. The method as recited in claim 14, wherein the upper return part (30) is screwed tightly to the lower housing part (16) before the upper housing part (18) is installed, before it is snapped in place with the lower housing part (16).

16. The method as recited in claim 15, wherein, while the upper return part (30) is being fastened to the lower housing part (16), the permanent magnets (22) are held in the correct installation position using a separating tool, which engages in radial openings (76) of the upper return part (30).

\* \* \* \* \*